United States Patent
Li et al.

(10) Patent No.: US 8,824,881 B2
(45) Date of Patent: Sep. 2, 2014

(54) CAMERA FLASH SYSTEMS AND METHODS FOR ADJUSTING FLASH EXPOSURE POWER

(75) Inventors: YuanGui Li, ShenZhen (CN); ChangChun Yin, ShenZhen (CN)

(73) Assignee: Eternal Fortune (HK) Limited, Hong Kong (CN)

( * ) Notice: Subject to any disclaimer, the term of this patent is extended or adjusted under 35 U.S.C. 154(b) by 195 days.

(21) Appl. No.: 13/527,916

(22) Filed: Jun. 20, 2012

(65) Prior Publication Data

US 2013/0069559 A1 Mar. 21, 2013
US 2014/0159610 A2 Jun. 12, 2014

Related U.S. Application Data

(60) Provisional application No. 61/536,319, filed on Sep. 19, 2011.

(51) Int. Cl.
*G03B 15/03* (2006.01)
*G03B 15/05* (2006.01)

(52) U.S. Cl.
CPC ........ *G03B 15/05* (2013.01); *G03B 2215/0557* (2013.01); *G03B 2206/00* (2013.01)
USPC .......................................................... 396/155

(58) Field of Classification Search
USPC .......................................................... 396/155
See application file for complete search history.

(56) References Cited

U.S. PATENT DOCUMENTS

| 5,692,223 A | * | 11/1997 | Ichikawa et al. | 396/182 |
| 2009/0185797 A1 | * | 7/2009 | Ogasawara | 396/59 |
| 2010/0008658 A1 | * | 1/2010 | King | 396/56 |
| 2011/0123185 A1 | | 5/2011 | Clark | |
| 2012/0033959 A1 | * | 2/2012 | King | 396/157 |
| 2013/0089313 A1 | * | 4/2013 | Clark | 396/164 |
| 2013/0128101 A1 | * | 5/2013 | Midorikawa et al. | 348/371 |

* cited by examiner

*Primary Examiner* — Rodney Fuller
(74) *Attorney, Agent, or Firm* — RatnerPrestia

(57) ABSTRACT

Camera flash systems and methods for data transmission between cameras and flash devices remote to the camera for remotely adjusting flash exposure power of the flash devices are disclosed. The camera flash systems include a transmitter and a receiver. The transmitter receives camera output data from a camera that includes exposure power data for at least one flash device remote to the transmitter and user input data that includes adjustments to the flash exposure power data for the at least one flash device. The transmitter is operable to transmit the adjusted flash exposure power data to the at least one flash device. The receiver receives the adjusted flash exposure power data from the transmitter and is operable to transmit the adjusted flash exposure power data to a flash device.

17 Claims, 4 Drawing Sheets

CAMERA FLASH SYSTEMS AND METHODS FOR ADJUSTING FLASH EXPOSURE POWER

CROSS REFERENCE TO RELATED APPLICATIONS

This application is related to and claims the benefit of U.S. provisional application Ser. No. 61/536,319 filed on Sep. 19, 2011, the contents of which are incorporated fully herein by reference.

FIELD OF THE INVENTION

The invention relates to the control of remote flash devices, and more particularly, to data transmission systems used between cameras and flash devices remote to the cameras for remotely adjusting flash exposure power for the flash devices.

BACKGROUND OF THE INVENTION

In conventional photography, a single camera may be able to wirelessly support one or more remote flash devices. Each flash device has an exposure power which regulates the intensity of the flash produced by the flash device. The flash exposure power for the flash device may be controlled manually, or may be controlled automatically using the camera. In particular, the camera may be used to calculate and control the remote flash devices' exposure power, by "through-the-lens" (TTL) mode.

In TTL mode, a camera will wirelessly transmit pre-flash instructions, which cause the remote flash devices to flash according to a certain power level. The camera will analyze the exposure power of the pre-flash and calculate a suitable brightness value for the formal exposure (i.e., for the photograph). The camera will then send the desired flash exposure power to the remote flash devices before the formal exposure.

Despite the benefits associated with conventional TTL mode, improvements in the control of flash exposure power are desired.

SUMMARY OF THE INVENTION

The present invention is embodied in camera flash systems and methods for data transmission between cameras and flash devices remote to the camera for remotely adjusting flash exposure power of the flash devices. The camera flash systems include a transmitter and a receiver. The transmitter receives camera output data from a camera that includes exposure power data for at least one flash device remote to the transmitter and user input data that includes adjustments to the flash exposure power data for the at least one flash device. The transmitter is operable to transmit the adjusted flash exposure power data to the at least one flash device. The receiver receives the adjusted flash exposure power data from the transmitter and is operable to transmit the adjusted flash exposure power data to a flash device.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Aspects of the present invention are directed to data transmission systems for use between cameras and flash devices remote to the cameras for remotely adjusting flash exposure power of the flash devices (referred to herein as camera flash systems). Generally, it makes it possible for cameras operating in TTL mode to adjust exposure power for compatible remote flash devices individually or in groups.

Figure 1:
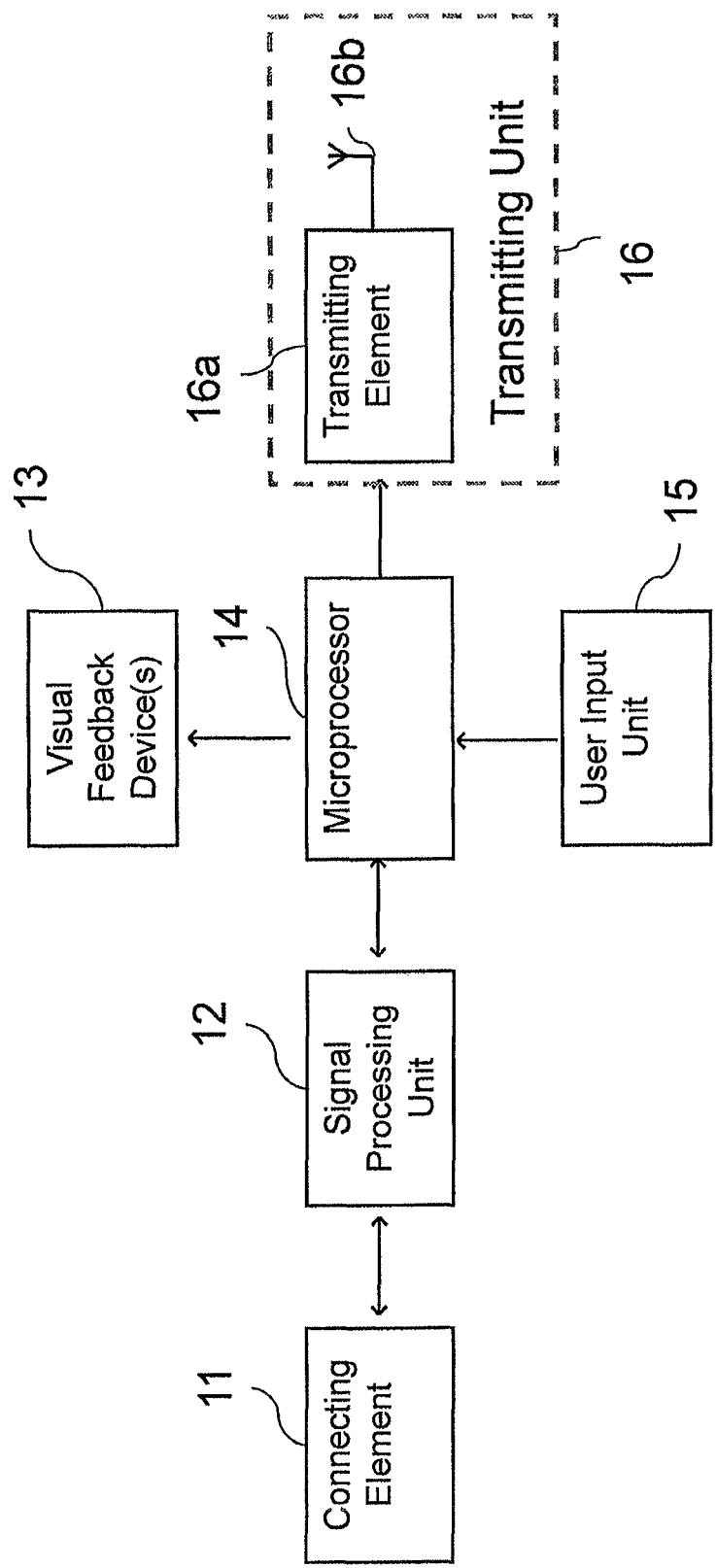
FIG. 1 is a block diagram of a transmitter for an exemplary camera flash system for adjusting flash exposure power in accordance with aspects of the present invention.
Figure 2:
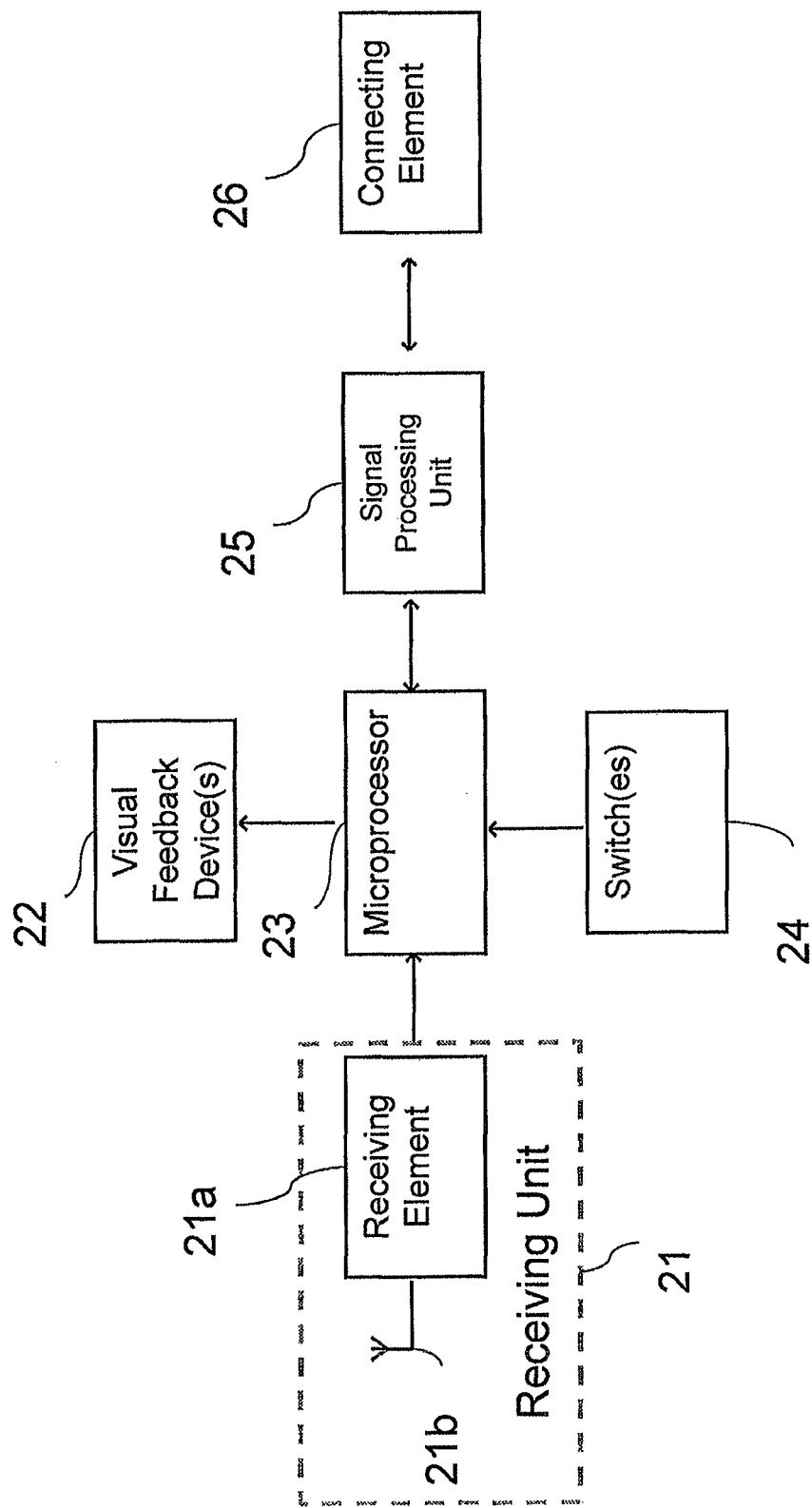
FIG. 2 is a block diagram of a receiver for an exemplary camera flash system for adjusting flash exposure power in accordance with aspects of the present invention.

In accordance with one aspect of the present invention, a camera flash system configured for adjusting flash exposure power is disclosed. The camera flash system includes a transmitter (e.g., as shown in FIG. 1) and a receiver (e.g., as shown in FIG. 2). Referring to the figures generally, the transmitter comprises a transmitter connecting element 11, a user input unit 15, and a transmitting unit 16. The transmitter connecting element is configured for coupling the transmitter to a camera (not shown). The transmitter is operable to receive data output by the camera ("camera output data") via the transmitter connecting element 11. The camera output data includes flash exposure power data for at least one remote flash device. The user input unit 15 is configured to receive user input data from a user of the camera flash system. The user input data includes adjustments to the flash exposure power data for at least one flash device remote to the transmitter. The transmitting unit 16 is operable to transmit the adjusted flash exposure power data (via a transmitting element 16a such as RF circuitry and an antenna 16b) to the at least one flash device. The receiver comprises a receiving unit 21 and a receiver connecting element 26. The receiving unit 21 is operable to receive the adjusted flash exposure power data from the transmitter (via antenna 21b and receiving element 21a such as RF circuitry). The receiver connecting element 26 is configured for coupling the receiver to a flash device. The receiver is operable to send the adjusted flash exposure power data to the flash device via the receiver connecting element 26.

Preferably, the camera flash system includes one or more groups of flash devices remote to the transmitter. Each group includes one or more flash devices. The one or more flash device of each group having an associated receiver. The camera output data comprises a set of flash exposure power data for each of the group(s) of flash devices. The user input data comprises adjustments to each set of flash exposure power data. More preferably, the transmitter is operable to transmit each set of adjusted flash exposure power data separately, and the receiver is operable to receive the adjusted flash exposure power data for the group of flash devices with which its receiver is associated.

Preferably, the transmitter is operable to receive pre-flash data from the camera via the transmitter connecting element 11. The pre-flash data comprises instructions to at least one flash device to perform a flash operation. The transmitting unit 16 is further operable to transmit the pre-flash data to at least one flash device.

Preferably, the adjusted flash exposure power data transmitted by the transmitting unit 16 includes instructions to at least one flash device to perform a flash operation using the flash exposure power provided in the adjusted flash exposure power data.

In accordance with another aspect of the present invention, a method for adjusting flash exposure power is disclosed. The method includes receiving camera output data from a camera at a transmitter, the camera output data including flash exposure power data for at least one group of flash devices, receiving user input data from a user at the transmitter, the user input data including adjustments to the flash exposure power data for the at least one group of flash devices, and transmitting the adjusted flash exposure power data to the at least one group of flash devices.

Figure 4:
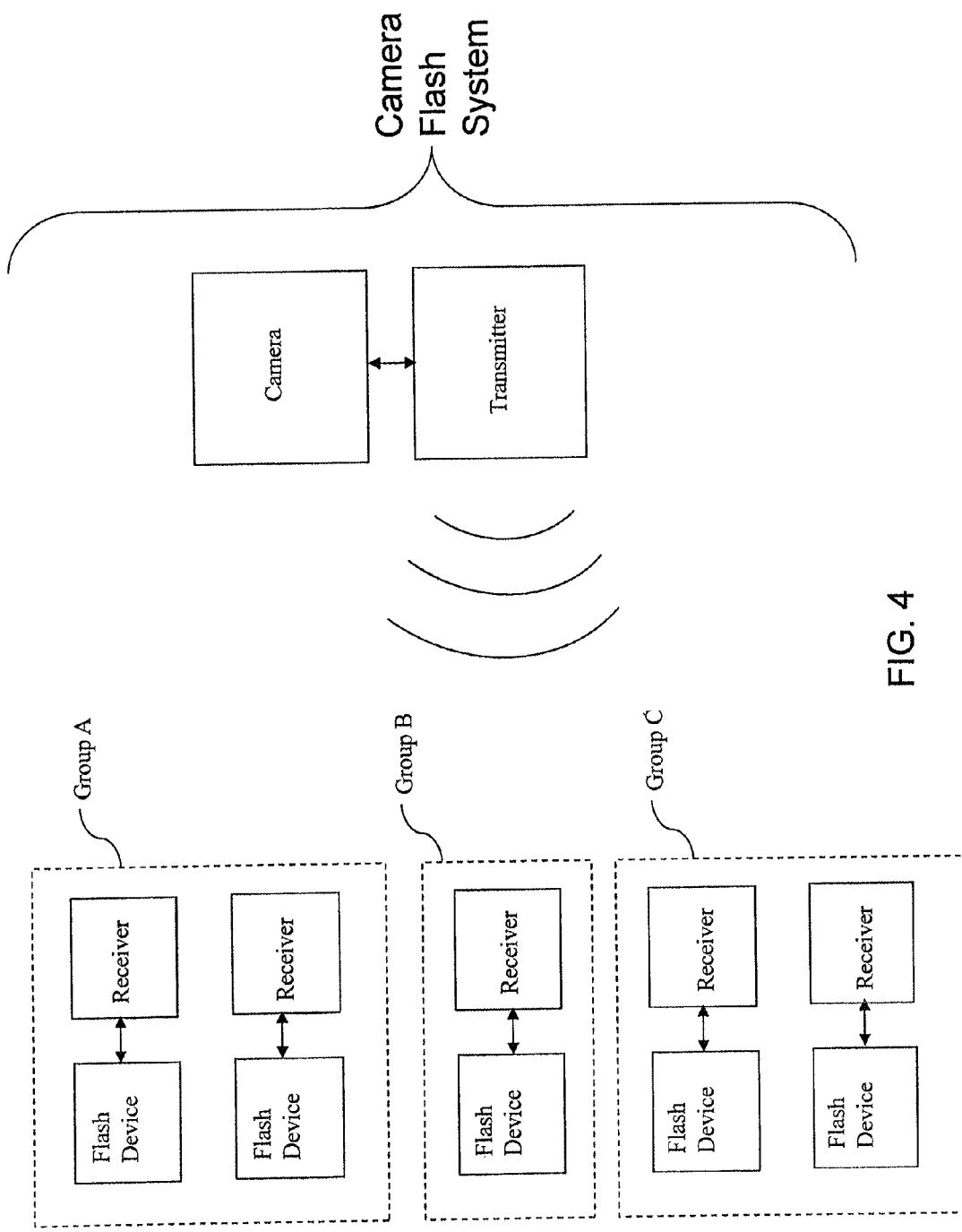
FIG. 4 is a block diagram of a camera flash system for adjusting flash exposure power in accordance with aspects of the present invention.

With reference to the drawings, FIG. 4 discloses a camera flash system for independently grouping and adjusting the flash exposure power of at least one flash device, in accordance with aspects of the present invention. The system is operable to independently group a camera's through-the-lens (TTL) exposure power calculations, and to wirelessly transmit them to flash devices after adjustment.

A transmitter of the above-described system is shown in FIG. 1. The transmitter includes a connecting element 11 for connection to a camera. The connecting element 11 may be adapted to connect via a hot shoe connector on the camera. The transmitter further includes signal processing unit 12 for processing signals received from the camera. The transmitter includes one or more visual feedback device(s) 13 (e.g., a monitor and/or an LED) for providing feedback to a user regarding the operation of the transmitter. The transmitter includes a microprocessor 14 for controlling the operation of the transmitter and performing the functions recited herein. The transmitter includes a user input unit 15 (e.g., a keyboard) for enabling input of data from a user (e.g., adjustment data). Finally, the transmitter includes a transmitting unit 16 for wirelessly transmitting data (e.g., flash exposure power data via a transmitting element 16a and an antenna 16b) to corresponding receivers at flash devices remote to the transmitter.

The disclosed transmitter may obtain TTL automatic exposure power datum via a connecting element 11 adapted to connect to the camera's hot shoe connector. In accordance with one aspect of the present invention, the transmitter independently groups the camera's exposure power datum for each group of remote flash devices using microprocessor 14, and wirelessly transmits them to the flash devices using transmitting unit 16 after enabling adjustment by a user (e.g., through a user input unit 15 such as a keyboard). Accordingly, each group of flash devices can adjust their exposure power independently, without affecting the exposure power of flash devices in other groups. Additionally, the disclosed transmitter enables the combination of flash devices operating in manual exposure mode together with flash devices operating in automatic exposure mode.

A receiver of the above-described system is shown in FIG. 2. The receiver includes a receiving unit 21 which is the counterpart of the transmitting unit 16 of the transmitter. The receiving unit 21 is configured for wirelessly receiving data (e.g. flash exposure power data via antenna 21b and receiving element 21a) at the flash device(s) remote to the transmitter. The receiver includes one or more visual feedback device(s) 22 (e.g., an LED status indicator) for providing feedback to a user regarding the operation of the receiver. The receiver includes a microprocessor 23 for controlling the operation of the receiver and performing the functions recited herein. The receiver also includes one or more switches 24 for switching the remote flash device group with which the remote flash device is associated and/or switching the channel on which the receiver receives signals from the transmitter. The receiver further includes signal processing unit 25 for processing signals to be sent to the flash device. Finally, the receiver includes a connecting element 26 for connection to the flash device. The connecting element 26 may be adapted to connect via a hot shoe connector on the flash device.

Figure 3:
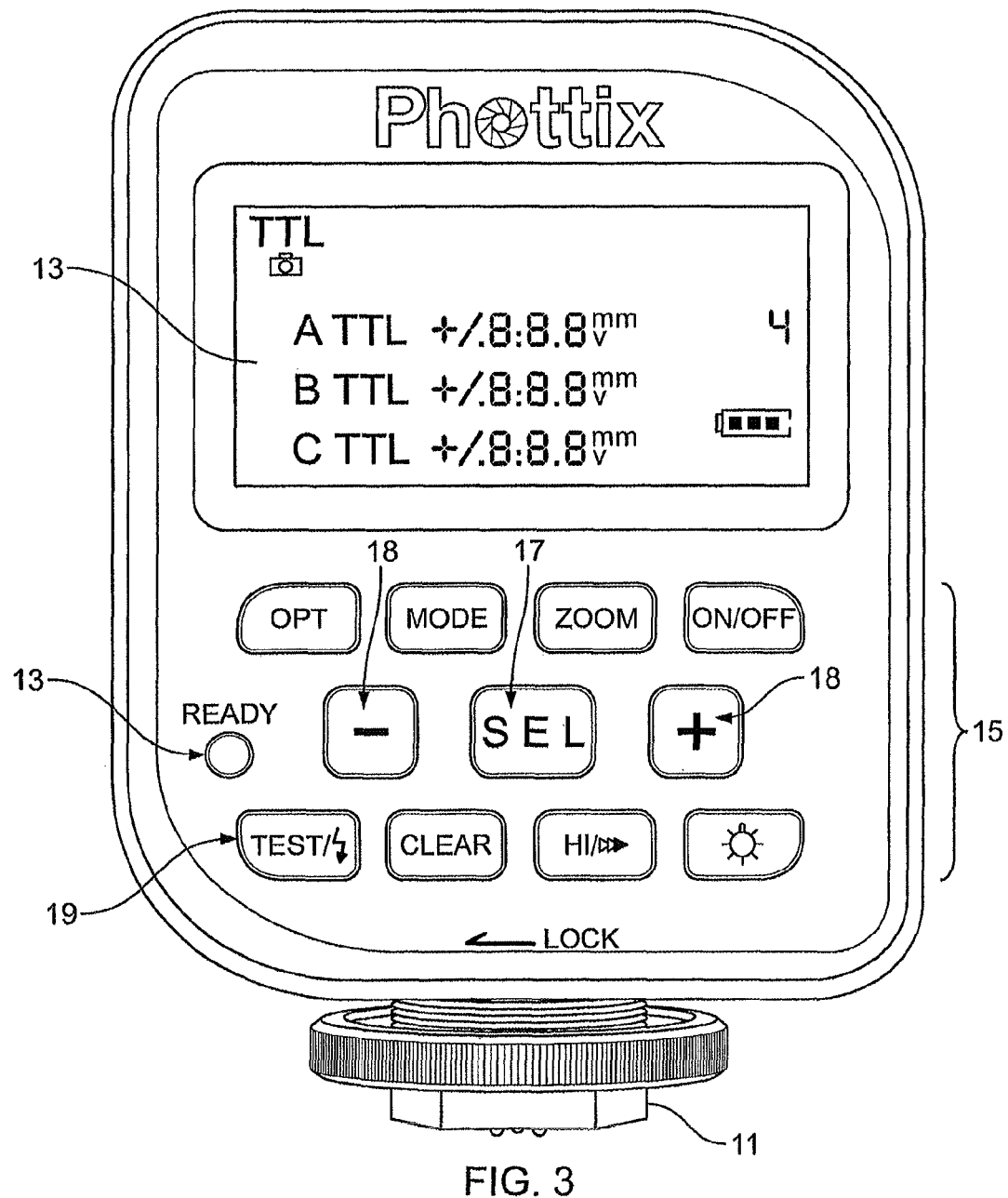
FIG. 3 is an image of the transmitter of FIG. 1.

As shown in FIG. 3, the transmitter includes button controls and an LCD to adjust the mode, power levels, and functions of flash devices remote to the transmitter.

An exemplary operation of the system for adjusting flash exposure power is described herein. First, the transmitter reads a pre-flash instruction sent out by the camera, and transmits it to the receiver or plural receivers. After the receiver(s) get the pre-flash instructions, it/they will give notice to the flash device to perform the pre-flash. After the flash devices perform the flash operation, the camera catches the brightness of the pre-flash, through TTL monitoring. The camera will then calculate the flash exposure power of each group of flash devices (e.g., three groups of flash devices: A, B, C). Next, the transmitter receives the flash exposure power data from the camera via the hot shoe of the camera. After the transmitter independently receives the flash exposure power data for each group, the data of each group is adjusted according to the values entered by the user on the transmitter buttons/LCD of the transmitter. For example, the user can choose to add light, reduce light or make no adjustment to the flash exposure power calculated by the camera. The adjusted flash exposure power is then transmitted to the receiver(s) wirelessly, e.g., by RF signal.

After the receiver receives the adjusted flash exposure power data, the adjusted exposure power data is transmitted to the flash device via the hot shoe connector of the flash device. The flash device may then flash synchronously with other flash devices based on the adjusted flash exposure power.

By using wireless remote control technology to remotely control the flash devices, aspects of the present invention achieve automatic photometry with independent grouping and adjustment of exposure power.

In an exemplary embodiment the system includes a plurality of receivers, with each receiver associated with a flash device. The flash devices may be grouped into one or more (e.g.; three) groups of flash devices. Each flash device may be independently set in TTL mode or manual mode. In an exemplary embodiment, in manual mode, the available exposure powers may include: 1/1, 1/1-1/3, 1/1-2/3, 1/2, 1/2-1/3, 1/2-2/3, 1/4, 1/4-1/3, 1/4-2/3, 1/8, 1/8-1/3, 1/8-2/3, 1/16, 1/16-1/3, 1/16-2/3, 1/32, 1/32-1/3, 1/32-2/3, 1/64, 1/64-1/3, 1/64-2/3, 1/128. In the exemplary embodiment, in TTL mode, the adjustment of the exposure power automatically calculated by the camera may include: −3.0 Ev, −2.7 Ev, −2.3 Ev, −2.0 Ev, −1.7 Ev, −1.3 Ev, −1.0 Ev, −0.7 Ev, −0.3 Ev, +0 Ev, +0.3 Ev, +0.7 Ev, +1.0 Ev, +1.3 Ev, +1.7 Ev, +2.0 Ev, +2.3 Ev, +2.7Ev, +3.0Ev (where "Ev" stands for "Exposure value").

The system may be configured such that it is necessary to take one photograph for the transmitter and receiver pair to properly perform the TTL monitoring.

Exemplary functions of aspects of the present invention are set forth below.

The transmitter has at least two function screens: TTL/Mixed (shown in FIG. 3) and Ratio. TTL/Mixed allows groups A, B and C to be set to TTL, Manual, or OFF with adjustments to Ev or power levels. In the Ratio screen, the ratio of groups A and B can be set from 8:1 to 1:8 for example. Ev levels can also be adjusted. An option button on the transmitter may be actuated to change between function screens.

The transmitter may include a Selection Button 17 that allows a user to cycle through groups A, B, and C, and Channel selections. The adjustment buttons 18 on the transmitters will enable a user to change the EV adjustments or Power Level while groups A, B or C are selected and will change the transmission channel (1, 2, 3 or 4) when Channel is selected. This will change the channel the transmitter uses to transmit. The transmitter will work on the last channel which was adjusted. For the Ration function screen, the Selection Button 17 allows a user to cycle through ratio A:B adjustment, EV adjustment and Channel selections.

The transmitter further includes a test button 19. The test button enables a user to fire all flashes connected to receivers that are on the same channel as the transmitter. Pressing the Test button may enable the remote flash devices to fire in sequence: Group A, followed by Groups B and C.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A camera flash system configured for remotely adjusting flash exposure power comprising:
    a transmitter comprising:
        a transmitter connecting element configured for coupling the transmitter to a camera, the transmitter being operable to receive camera output data from the camera via the transmitter connecting element, the camera output data including flash exposure power data for a plurality of groups of flash devices remote to the transmitter;
        a user input unit configured to receive user input data from a user of the camera flash system, the user input data including adjustments to the flash exposure power data for each of the plurality of groups of flash devices independent from others of the plurality of groups of flash devices; and
        the transmitter being operable to transmit the adjusted flash exposure power data for each of the plurality of groups of flash devices to the corresponding group; and
    the plurality of groups of flash devices, each group comprising one or more flash devices, the one or more flash devices of each group each having an associated receiver, the receiver comprising:
        a receiving unit operable to receive the adjusted flash exposure power data corresponding to the group in which the flash device is located from the transmitter; and
        a receiver connecting element configured for coupling the receiver to one of the at least one flash device, the receiver being operable to transmit the adjusted flash exposure power data to the one of the at least one flash device via the receiver connecting element.

2. The camera flash system of claim 1, wherein:
the transmitter is operable to transmit each set of adjusted flash exposure power data separately; and
the receiver is operable to receive the adjusted flash exposure power data for the group of flash devices with which its receiver is associated.

3. The camera flash system of claim 1, wherein:
the transmitter is further operable to receive pre-flash data from the camera via the transmitter connecting element, the pre-flash data comprising instructions to the at least one flash device to perform a flash operation; and
the transmitter is further operable to transmit the pre-flash data to the at least one flash device.

4. The camera flash system of claim 1, wherein the adjusted flash exposure power data transmitted by the transmitter further comprises instructions to the at least one flash device to perform a flash operation using the flash exposure power provided in the adjusted flash exposure power data.

5. The camera flash system of claim 1, wherein at least one of the plurality of groups of flash devices includes two or more flash devices.

6. The camera flash system of claim 1, wherein
the transmitter includes a display for visually displaying information to the user, and
the transmitter is configured to display the flash exposure data for each of the plurality of groups of flash devices, and the adjustments to the flash exposure data for each of the plurality of groups of flash devices, on the display.

7. The camera flash system of claim 1, wherein the user input unit enables the user to set the flash exposure power data for one of the plurality of groups of flash devices to be different from but calculated based on the flash exposure power data for another one of the plurality of groups of flash devices.

8. A transmitter configured for remotely adjusting flash exposure power in a camera flash system, the transmitter comprising:
    a transmitter connecting element configured for coupling the transmitter to a camera, the transmitter being operable to receive camera output data from the camera via the transmitter connecting element, the camera output data including flash exposure power data for a plurality of groups of flash devices remote to the transmitter;
    a user input unit configured to receive user input data from a user of the transmitter, the user input data including adjustments to the flash exposure power data for each of the plurality of groups of flash devices independent from others of the plurality of groups of flash devices; and
    the transmitting unit operable to transmit the adjusted flash exposure power data for each of the plurality of groups of flash devices to the corresponding group.

9. The transmitter of claim 8, wherein:
the user input unit is configured to receive user input data including adjustments to the flash exposure power data for a plurality of groups of flash devices remote to the transmitter, each group comprising one or more flash devices;
the camera output data comprises a set of flash exposure power data for each of the plurality of groups of flash devices; and
the user input data comprises adjustments to each set of flash exposure power data.

10. The transmitter of claim 9, wherein:
the transmitter is operable to transmit each set of adjusted flash exposure power data separately.

11. The transmitter of claim 8, wherein:
the transmitter is further operable to receive pre-flash data from the camera via the transmitter connecting element, the pre-flash data including instructions to the at least one flash device to perform a flash operation; and
the transmitter is further operable to transmit the pre-flash data to the at least one flash device.

12. The transmitter of claim 8, wherein
the adjusted flash exposure power data transmitted by the transmitter further comprises instructions to the at least one flash device to perform a flash operation using the flash exposure power provided in the adjusted flash exposure power data.

13. A method for remotely adjusting flash exposure power comprising:
   receiving camera output data from a camera at a transmitter, the camera output data including flash exposure power data for a plurality of groups of flash devices remote to the camera;
   receiving user input data from a user at the transmitter, the user input data including adjustments to the flash exposure power data for each of the plurality of groups of flash devices independent from others of the plurality of groups of flash devices; and
   transmitting the adjusted flash exposure power data for each of the plurality of groups of flash devices to the corresponding group.

14. The method of claim 13, wherein:
   the step of receiving camera output data comprises receiving camera output data including a set of flash exposure power data for each of a plurality of groups of flash devices remote to the transmitter, each group comprising one or more flash devices; and
   the step of receiving user input data comprises receiving user input data including adjustments to each set of flash exposure power data.

15. The method of claim 14, wherein:
   the transmitting step comprises transmitting each set of adjusted flash exposure power data separately.

16. The method of claim 13, further comprising the steps of:
   communicating pre-flash data from the camera to the transmitter, the pre-flash data including instructions to the at least one flash device to perform a flash operation; and
   transmitting the pre-flash data to the at least one flash device.

17. The method of claim 13, further comprising the step of:
   transmitting instructions to the at least one flash device to perform a flash operation using the flash exposure power provided in the adjusted flash exposure power data.

* * * * *